United States Patent [19]

Dively

[11] Patent Number: 4,785,376
[45] Date of Patent: Nov. 15, 1988

[54] UTILITY PEDESTAL CONSTRUCTION

[76] Inventor: Robert C. Dively, 105 William Allen, Williamsburg, Va. 23185

[21] Appl. No.: 38,297

[22] Filed: Apr. 14, 1987

[51] Int. Cl.⁴ .......................... H02B 9/00; H02G 3/18
[52] U.S. Cl. .................................... 361/334; 137/356; 174/38; 361/357; 361/365
[58] Field of Search .................... 174/38, 50; 361/331, 361/332, 334, 356, 357, 364, 365, 369; 362/96, 431; 137/356, 363; 312/100

[56] References Cited

U.S. PATENT DOCUMENTS

| 3,891,899 | 6/1975 | Sparling | 137/356 X |
| 4,307,436 | 12/1981 | Eckart et al. | 174/38 X |
| 4,519,657 | 5/1985 | Jensen | 174/38 X |

FOREIGN PATENT DOCUMENTS 1001265  8/1965  United Kingdom .................. 174/50

Primary Examiner—Laramie E. Askin
Attorney, Agent, or Firm—Walter F. Wessendorf, Jr.

[57] ABSTRACT

A utility pedestal primarily designed as a marina power pedestal but useful in connection with recreational vehicles and other power consuming units. Twin half shell housing members joined by an anodized aluminum strip closure member forms an upper pedestal. The strip closure member has an inner extending flange to which a central divider is secured to divide the upper pedestal into two substantially symmetrical compartments, one for high voltage and one for low voltage such as telephones and cable television. An open bottom base pedestal supports the upper pedestal and is secured to the dock pier. It contains the water utilities and is provided with a slotted top to introduce high voltage cables into the high voltage compartment of the upper pedestal. Because each utility pedestal services two units, the compartmentalized upper pedestal is provided with conduits for transferring low voltage cables through the high voltage compartment and for isolating high voltage cables from low voltage components in the low voltage compartment.

4 Claims, 5 Drawing Sheets

UTILITY PEDESTAL CONSTRUCTION

BACKGROUND OF THE INVENTION

1. Technical Field

This invention relates to a self-contained utility pedestal construction, mountable near a dock pier or other foundation; receiving therein underground high-voltage electrical power cables, low-voltage telephone lines, low-voltage television cables, and water service lines; separating and electrically isolating from one another the high-voltage electrical power cables, low-voltage telephone lines, low-voltage television cables, and water service lines, to guard against fires, electrical interference, on-site wiring errors, and other mishaps; and servicing, in pairs separately and independently of each other, boats, recreational vehicles, etc., by providing metered high-voltage electrical power, telephone service, cable television service and water service.

2. Background

The problems in the art to which this invention apertains are the needs for a self-contained utility pedestal construction that can be mounted near or on a dock pier or other foundation to service, in pairs separately and independently of each other, boats, recreational vehicles, etc., by providing metered high-voltage electrical power, telephone service, cable television service and water service, and with such self-contained utility pedestal construction receiving therein underground high-voltage electrical power cables, low-voltage telephone lines, low-voltage television cables, and water service lines that are not comingled, and with such self-contained utility pedestal construction separating and electrically isolating from one another the high-voltage electrical power cables, low-voltage telephone lines, low-voltage television cables, and water service lines, to guard against fires, electrical interference, on-site wiring errors, and other mishaps.

SUMMARY OF THE INVENTION

The objects of the invention are to contribute to the solution of the discussed problems of the art by providing a utility pedestal construction comprising an upper pedestal unit mounted on a base pedestal member fixed in mounted relationship on a dock pier or other foundation. The upper pedestal unit and base pedestal member are made of suitable plastic material. The base pedestal member receives therein underground high-voltage electrical power cables, low-voltage telephone lines, low-voltage television cables and water service lines. The water service lines are connected interiorly in communicative relationship with hose bibbs carried exteriorly and laterally on the base pedestal member. The upper pedestal unit carries therein a longitudinally disposed central inner divider member that divides the upper pedestal unit into two longitudinal half-shell compartments that are spatially equal and symmetrical. One of the compartments is a high-voltage compartment and the other compartment is a low-voltage compartment. The high-voltage electrical power cables lead into the high-voltage compartment, and the separated low-voltage telephone lines and television cables lead into the low-voltage compartment. The upper portions of the half-shell high and low voltage compartments mount laterally opposed, outwardly-faced transparent face plates carrying outwardly-faced high-voltage receptacle outlet means that are metered. The high-voltage electrical power cables are operatively connected to the high-voltage receptacle outlet means in the high-voltage compartment; and high-voltage electrical power cables transversely cross over and through the central inner divider member into the low-voltage compartment, above transversely disposed and mounted barrier isolating means in the low-voltage compartment, and are operatively connected to high-voltage receptacle outlet means in the low-voltage compartment. The bight portions of the high and low voltage compartments mount outwardly-faced telephone receptacle means and male television cable connector means which are spatially disposed longitudinally below the barrier isolating means in the low-voltage compartment. The low-voltage telephone lines and television cables are operatively connected to the telephone receptacle outlet means and male television cable connector means in the low-voltage compartment; and the low-voltage telephone lines and television cables transversely cross over and lead from the low-voltage compartment through an isolating conduit means in the high-voltage compartment, with the conduit means transversely projecting through the central inner divider member into the low-voltage compartment, into the high-voltage compartment and such low-voltage telephone lines and television cables are operatively connected to the respective telephone receptacle outlet means and male television cable connector means in such high-voltage compartments. The upper pedestal unit has upper portions configured in downward converging relationship which mount the outwardly-faced transparent face plates which provide and direct angled illumination, from a fluorescent light inside the pedestal unit, laterally from the sides of the pedestal unit onto the immediate area of the pedestal unit and not into the eyes of boaters.

BRIEF DESCRIPTION OF THE DRAWINGS

These objects and other objects of the invention should be discerned and appreciated from the detailed description taken in conjunction with the drawings, wherein like reference numerals refer to similar parts throughout the several views, in which:

FIG. 4a is a perspective view of the base pedestal member of FIG. 1;

FIG. 8 is a perspective view of a modification of the base pedestal; and

FIG. 9 is an elevational view in vertical cross section taken along the line in the direction of the arrows 9—9 in FIG. 8.

DETAILED DESCRIPTION OF THE PREFERRED EMBODIMENT

Figure 1:
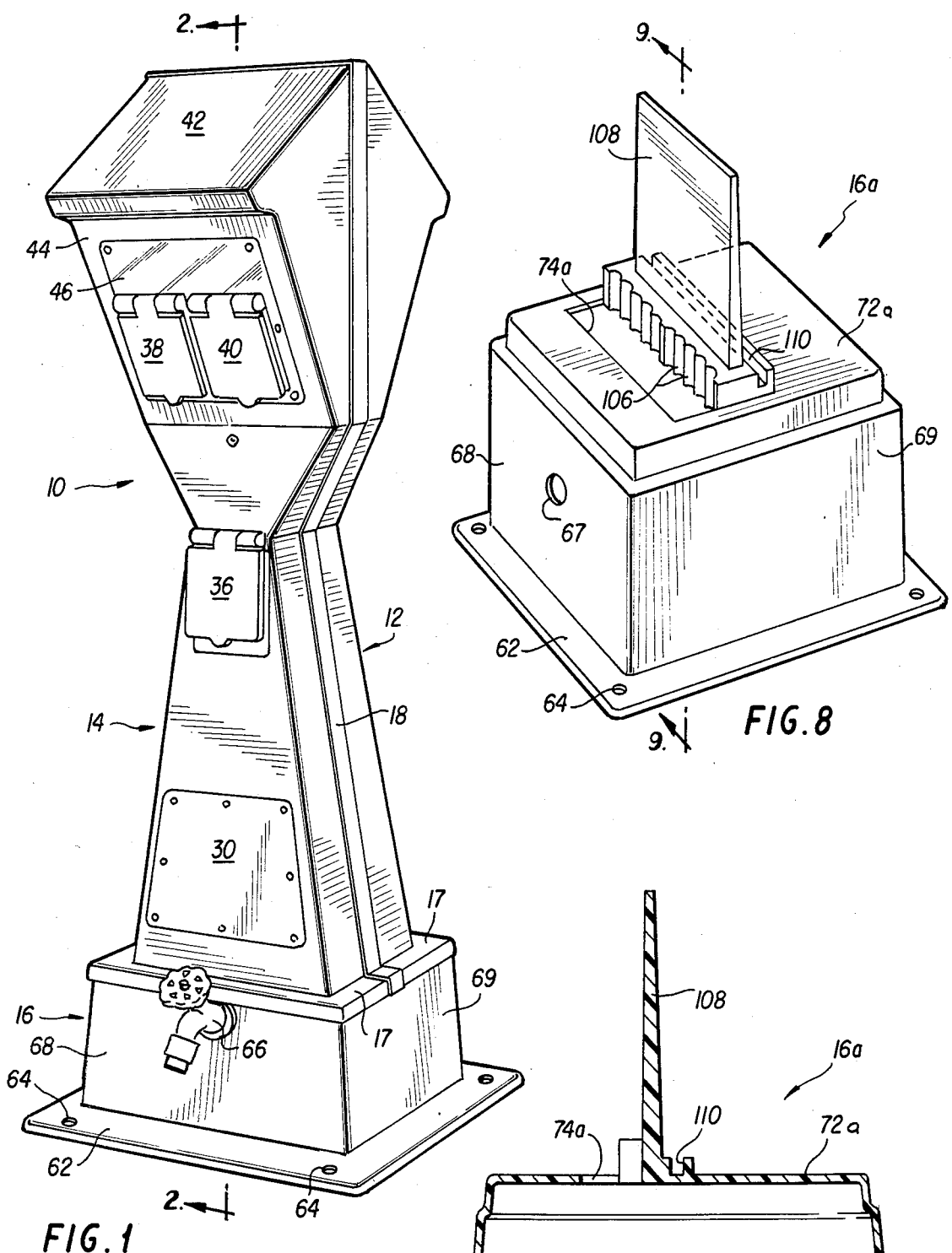
FIG. 1 is a perspective view of the utility pedestal construction in accordance with the present invention.

In FIG. 1 of the drawings, reference numeral 10 generally refers to the utility pedestal construction of this invention. The utility pedestal construction or utility pedestal unit 10 has one upper pedestal half shell housing member, generally referred to by reference numeral 12, containing high-voltage power components; and a second upper pedestal half shell housing member, generally referred to by reference numeral 14, containing low-voltage power components. The two upper pedestal half shell housing members 12 and 14 are mirror images of each other and are mounted in appropriately disposed relationship with a base pedestal member, generally referred to by reference numeral 16. The upper pedestal housing members 12 and 14 are fixed together by means of their depending flanged bottoms 17. The upper pedestal housing members 12 and 14 are secured to each other in such fixed relationship by means of an anodized aluminum strip closure member 18 and pop rivets (not shown). Strip closure member 18 has inner extending flange means 20, suitably grooved as indicated by reference numeral 22, to receive expanded polyethylene foam 24 which aids the prevention of water penetration into the utility pedestal unit 10.

A center isolator and lamp support member 26, made from Sintra supplied by 3M Company, constitutes a central inner divider member which effectively separates and divides the two upper pedestal housing members 12 and 14 into two longitudinal half-shell compartments that are spatially equal and symmetrical. As a safety feature, isolation protectors 28 are secured to the lower and outer marginal portions of the central inner divider member 26 on the high-voltage side thereof.

Figure 2:
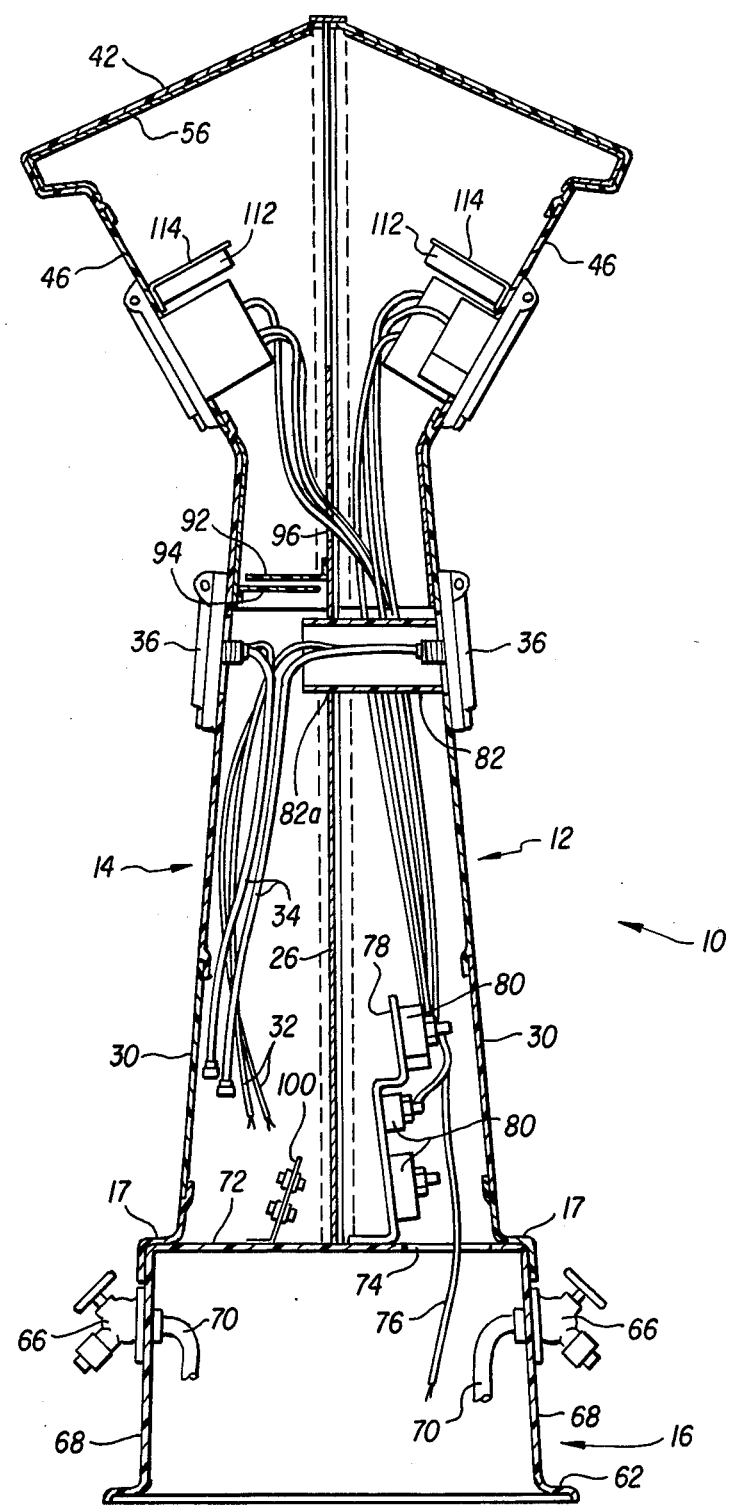
FIG. 2 is an elevational view in vertical cross section taken along the line in the direction of the arrows 2—2 in FIG.
Figure 3:
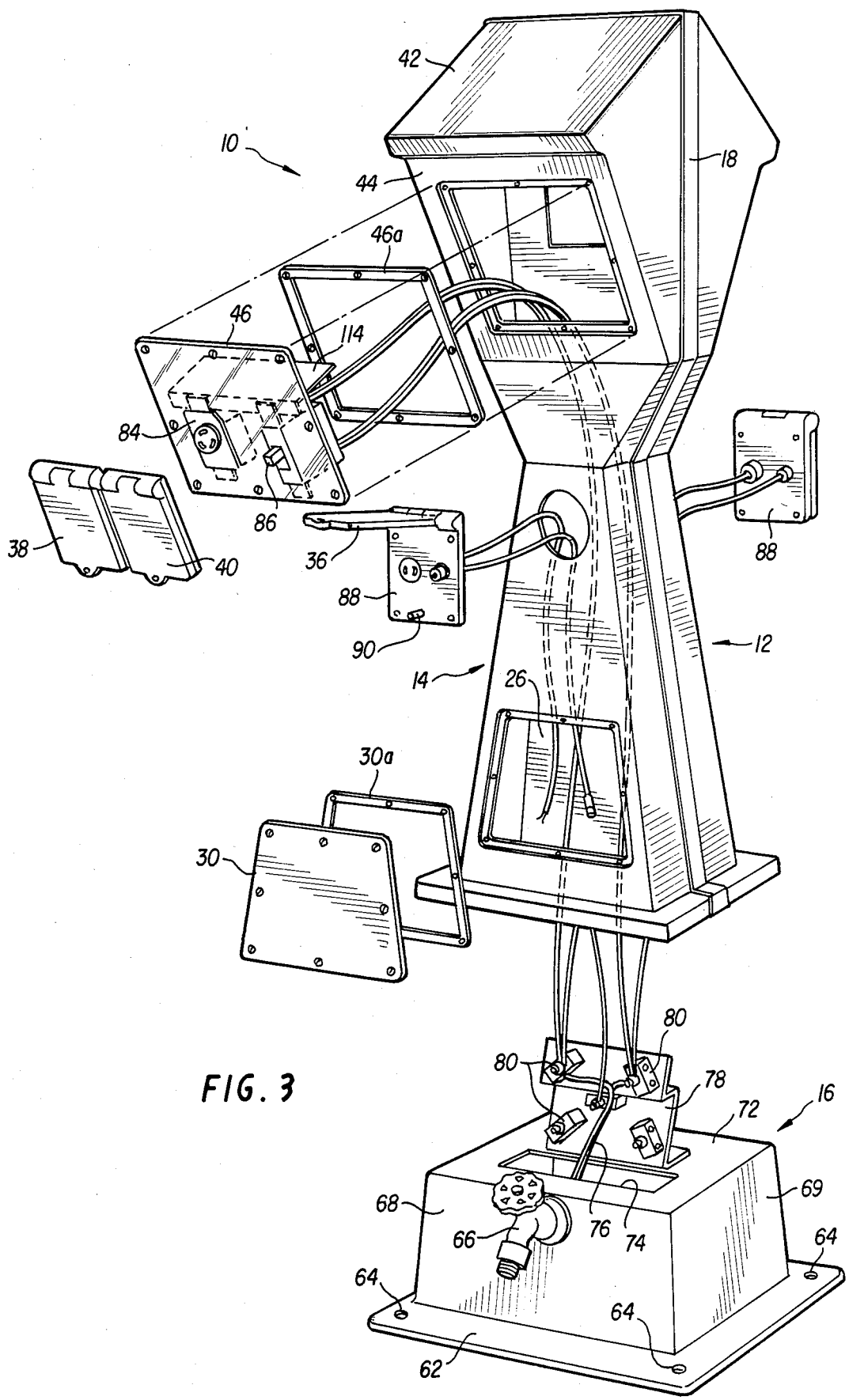
FIG. 3 is an exploded perspective view of the utility pedestal construction of FIG. 1.
Figure 4:
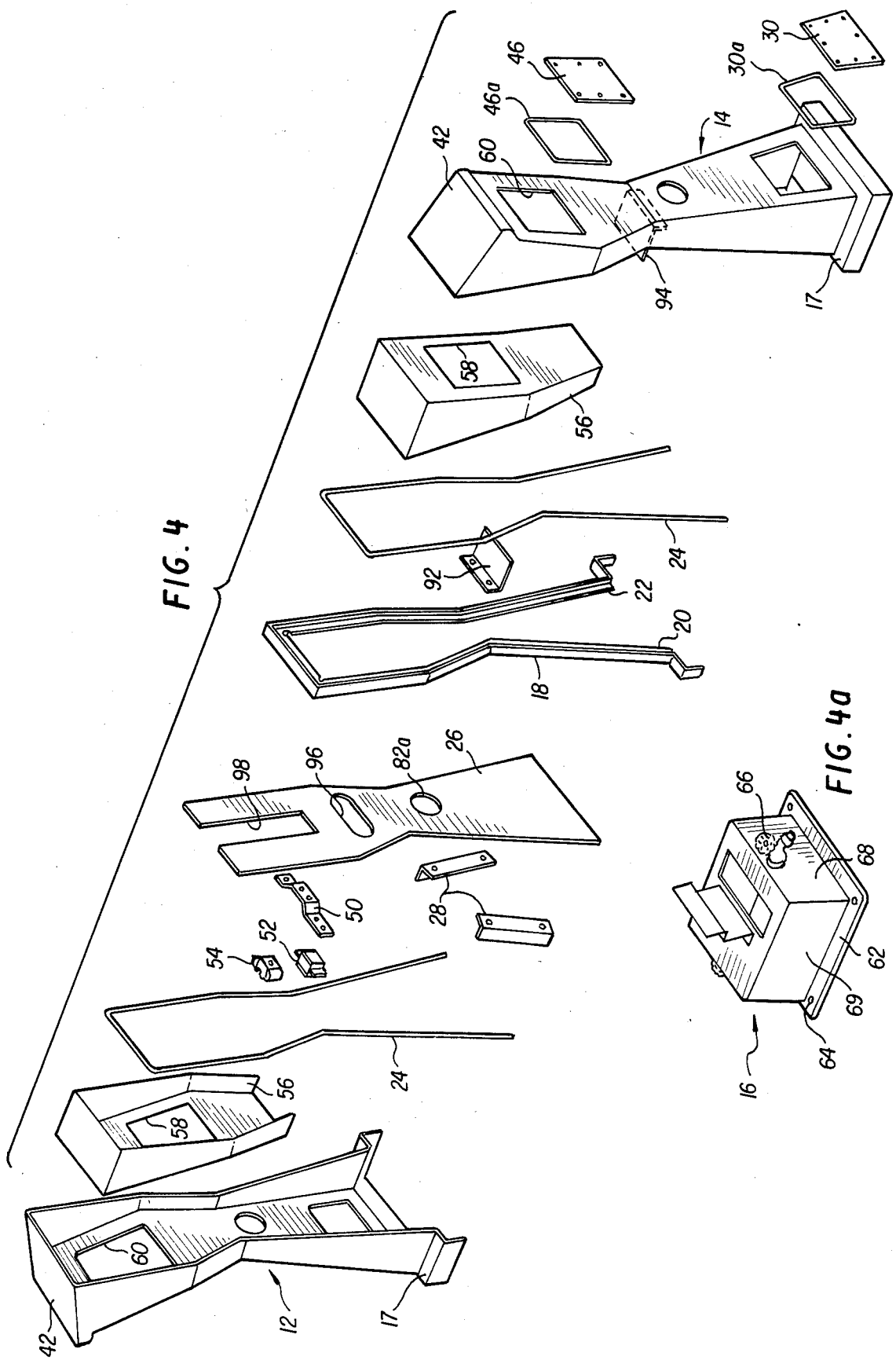
FIG. 4 is an exploded view of the upper pedestal member of FIG. 1.

As shown in FIGS. 3 and 4, each of the upper half shell housing members 12 and 14 has an access plate 30 with a suitable gasket sealing means 30a. FIG. 2 shows the admission of low-voltage telephone lines 32 and television cables 34 through cover plate 36 on each of the upper pedestal half shell housing members 12 and 14. FIG. 1 also shows a power receptacle outlet cover plate 38 and an electronic switch cover plate 40 for utility service from the pedestal unit 10. Each of the pedestal half shell housing members 12 and 14 has a sloping top 42 and an angled wall 44. Sloping top 42 makes an angle of about 30° to the horizontal. A clear and transparent polycarbonate face plate 46 is affixed to each of the housing members 12 and 14 with an intermediate sealing gasket 46a, as shown in FIGS. 3 and 4, permitting a fluorescent light source from within the utility pedestal unit 10 to provide illumination through the transparent face plates 46 and to be directed outwardly and laterally from the sides of the pedestal unit 10 onto the immediate area of the dock pier, as well as the receptacle outlets and switches of pedestal unit 10 but without shining into the eyes of the boaters.

FIG. 4 shows a grounding buss and lamp holder element 50 and fluorescent light ballast 52 and socket 54. Aluminum foil reflective surfaces 56, laminated to paper backings, provide indirect lighting from the utility pedestal unit 10. Aluminum paint may be applied to the inside surface of the upper portions of the upper pedestal half shell housing members 12 and 14. Each of the reflective surfaces 56 has a cut-out portion 58 in registry with each of the window area openings 60 of the upper pedestal half shell housing members 12 and 14.

The base pedestal member 16 has a peripheral flange 62 and suitable apertures 64 for mounting bolts (not shown) to affix the base pedestal member 16 to the dock pier or other suitable foundation means. A hose bibb or faucet 66 is attached to each opposed lateral wall 68 of the base pedestal member 16. For this purpose, each lateral wall 68 carriers a hose-bibb mounting plate 66a, interposed in fixed relationship between each hose bibb 66 and its associated lateral wall 68. The base pedestal member 16 has front walls 69. Water supply line hose members 70 are appropriately connected in communicative relationship with hose bibbs 66 through the bottom openings of base pedestal member 16. Base pedestal member 16 has a top wall 72; and top wall 72 has a slot 74 through which high-voltage cable means 76 are disposed and lead into the high-voltage compartment of the upper pedestal half shell housing member 12. The high-voltage cable means 76 are operatively connected to buss bars 80, fixedly carried by a buss-bar support bracket 78 disposed in the upper pedestal half shell housing member 12 for the high-voltage components.

The utility pedestal unit 10 serves two boats simultaneously, or two recreational vehicles or other power consuming units, in pairs. As shown in FIG. 2, each side of the utility pedestal unit 10 has telephone and cable television service through cover plates 36. As is shown in FIG. 2 and in order to electrically isolate their respective telephone and television cable leads 32 and 34 from high voltage in the high-voltage compartment defined by shell housing member 12, a transversely disposed conduit means 82 in high-voltage compartment 12 receives therein and therethrough such respective low-voltage telephone and television cable leads 32 and 34 for utilization in high-voltage compartment 12. As shown in FIG. 4, inner divider member 26 has a complemental opening 82a to receive conduit means 82.

As shown in FIG. 3, immediately behind power outlet cover plate 38 and switch cover plate 40 are the respective receptacle outlet means 84 and switch means 86, carried by transparent plate 46. As shown, cover plates 38 and 40 are in hinged relationship. Cover plates 36 are in hinged relationship with face plates 88 carried by the respective housing members 12 and 14. Face plates 88 mount the telephone receptacle outlet means and the male television cable connector means. Locking means 90 on face plates 88 cooperate with cover plates 36 to lock same thereto.

FIGS. 2 and 4 show slightly separated plastic barrier plate elements 92 and 94 in superposed relationship, transversely disposed and carried by the inner divider member 26 and shell housing member 14, respectively, to isolate the high-voltage power cable means 76 led through a slot 96 in divider member 26 into the low-voltage compartment 14 above barrier elements 92 and 94. Divider member 26 has a notched-out portion 98 to allow lateral illumination from the fluorescent light through both transparent polycarbonate face plates 46 carried by shell housing members 12 and 14.

Figure 5:
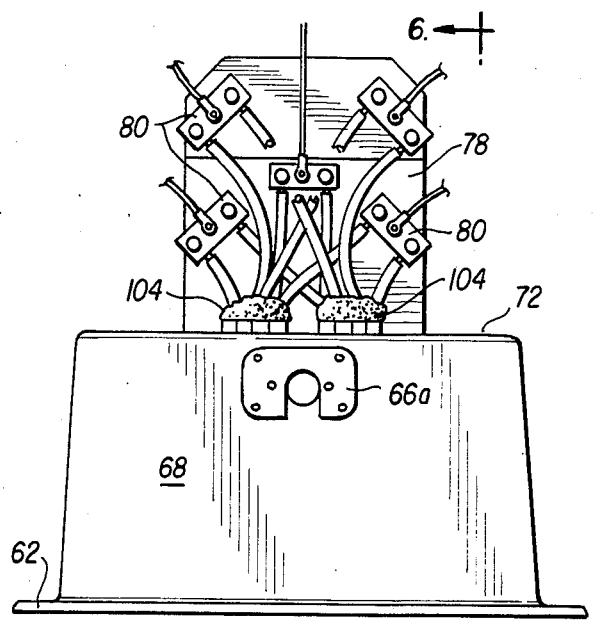
FIG. 5 is a fragmentary side elevational view, drawn to an enlarged scale, of the base pedestal member of FIG. 4a, with portions removed.
Figure 6:
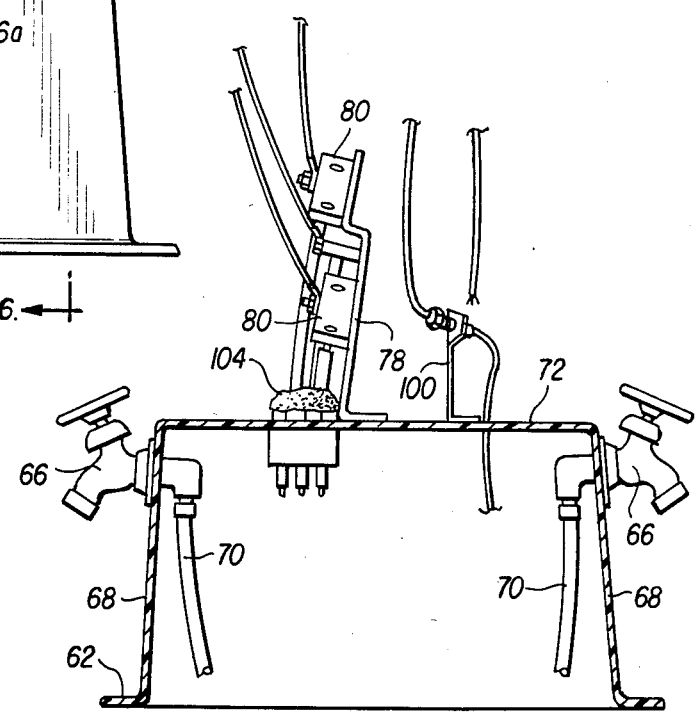
FIG. 6 is an elevational view in vertical cross section taken along the line in the direction of the arrows 6—6 in FIG. 5.
Figure 7:
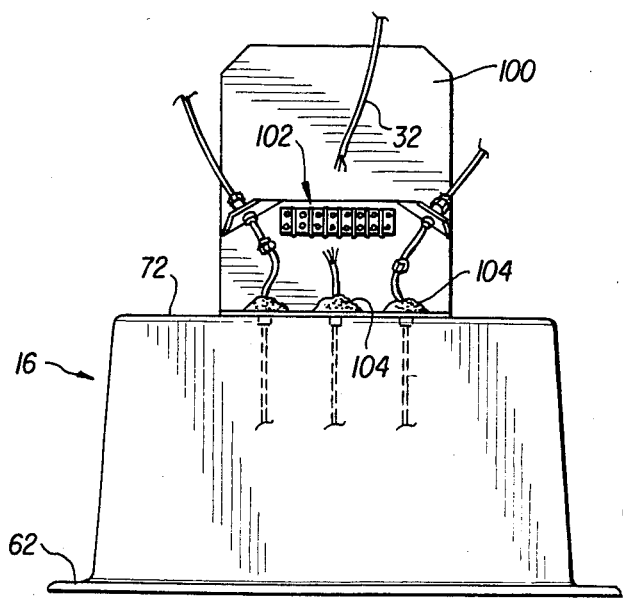
FIG. 7 is a fragmentary elevational view showing the low-voltage connections above the base pedestal of FIG. 5, with portions removed.

Upstanding from base pedestal member 16 is a mounting bracket 100, shown in FIGS. 6 and 7, for the telephone and television cable leads with silicone R.T.V. foam insulation, available from Dow Corning Company, appropriately applied thereto as indicated by reference numeral 104. Such foam insulation 104 is also applied around the high-voltage power cables 76, as illustrated in FIG. 5. Bracket 100 mounts a telephone terminal board, as indicated by reference numeral 102.

FIGS. 8 and 9 show another embodiment of the base pedestal member, generally referred to by reference numeral 16a, having a top wall 72a. Base pedestal member 16a has apertures 67 through which to connect the hose bibbs 66 with a source of water supply. Top wall 72a has a slot 74a. Top wall 72a carries an upstanding plate-like member 108, tapered in upward converging relationship, whose base is immediately adjacent slot 74a and has a semicircular depressions 106 which are adapted to receive therein the high-voltage cable means 76 that are led through slot 74a. So disposed in depressions 106, as described, a clamping lateral plate element (not shown) is adjustably positionable therewith to engage and secure the high-voltgage cable means 76. The tapered plate-like member 108 carries the buss bars 80 to which the high-voltage cable means 76 are operatively connected, in the same manner as has been previously described herein. Plate-like member 108 has an upstanding groove or recess 110 that receives therein the bottom surface of divider member 26.

Disposed interiorly of each of the angled walls 44 of housing members 12 and 14 is a bracket 114 which mounts an electronic watt-hour meter 112, viewable through the clear polycarbonate face plate 46, in order that the marina owner can determine the amount of electrical power usage by a boat owner.

Having thusly described my invention, I claim:

1. A utility pedestal construction for servicing, in pairs independently of each other, boats, recreational vehicles and other units, near a dock pier or other suitable foundation, with high-voltage electrical power, water, and low-voltage telephone and cable television services; said utility pedestal construction comprising twin upper shell housing members, shell housing securing means, central inner divider means and base pedestal means; said twin upper shell housing members and base pedestal means being made of suitable plastic material, said shell housing securing means assembling together said twin upper shell housing members in fixed relationship and defining an upper pedestal unit, said central inner divider means dividing said upper pedestal unit into two symmetrical compartments defining high-voltage and low-voltage compartments, said base pedestal means supporting thereon said upper pedestal unit, said base pedestal means having flange means for effecting securement with said dock pier or other suitable foundation, said base pedestal means having bottom and top openings, said bottom opening receiving water service supply lines into said base pedestal means, said base pedestal means having lateral walls exteriorly carrying hose bibb means, said water service supply lines and hose bibb means being operatively connected in communicative relationship, said bottom opening of said base pedestal means receiving therethrough high-voltage electrical power cable means, low-voltage telephone line means and low-voltage television cable means, separated from one another, said high-voltage electrical power cable means leading through said top opening in said base pedestal means and into said high-voltage compartment, said low-voltage telephone line means and television cable means leading through said opening in said base pedestal means and into said low-voltage compartment, said high-voltage and low-voltage compartments having upper portions carrying high-voltage receptacle outlet means, said high-voltage electrical power cable means being operatively connected to said high-voltage receptacle outlet means carried by said high-voltage compartment, said low-voltage compartment and central inner divider means mounting barrier isolating means below said high-voltage receptacle outlet means carried by said low-voltage compartment, said high-voltage electrical power cable means leading from said high-voltage compartment into said low-voltage compartment and aboe said barrier isolating means, and being operatively connected to said high-voltage receptacle outlet means carried by said low-voltage compartment, said high-voltage and low-voltage compartments exteriorly carrying telephone receptacle outlet means and television cable connector means below said barrier isolating means, said low-voltage telephone line means and television cable means being operatively connected to said respective telephone receptacle outlet means and television cable connector means carried by said low-voltage compartment, said high-voltage compartment having electrically isolating conduit means projecting through said cental inner divider means and into said low-voltage compartment, said low-voltage telephone line means and television cable means leading from said low-voltage compartment through said conduit means and being operatively connected to said respective telephone receptacle outlet means and television cable connector means carried by said high-voltage compartment.

2. A utility pedestal construction in accordance with claim 1, wherein is further provided fluorescent lighting means, wherein said twin upper shell housing members have upper portions in downward converging relationship, wherein said upper portions of said twin upper shell housing members have transparent panels, wherein said upper pedestal unit mounts said fluorescent lighting means therein to provide and direct angled illumination through said transparent panels laterally from the sides of said pedestal unit onto the immediate area thereof without shining into the eyes of boaters.

3. A utility pedestal construction in accordance with claim 2, wherein is further provided reflecting means for reflecting said fluorescent illumination through said transparent panels.

4. A utility pedestal construction in accordance with claim 1, wherein a further provided electronic kilowatt hour meter means and wherein said meter means is operatively connected to said high-voltage receptacle outlet means to measure and record electrical power consumption.

* * * * *